US012633040B2

(12) United States Patent
Herpin

(10) Patent No.: US 12,633,040 B2
(45) Date of Patent: May 19, 2026

(54) METHOD AND SYSTEM FOR TEXTURING AN IMAGE

(71) Applicant: PREVU3D Technologies, Inc., Montreal (CA)

(72) Inventor: Maxime Herpin, Montreal (CA)

(73) Assignee: PREVU3D Technologies, Inc., Montreal (CA)

( * ) Notice: Subject to any disclaimer, the term of this patent is extended or adjusted under 35 U.S.C. 154(b) by 413 days.

(21) Appl. No.: 18/342,004

(22) Filed: Jun. 27, 2023

(65) Prior Publication Data

US 2023/0419594 A1 Dec. 28, 2023

Related U.S. Application Data

(60) Provisional application No. 63/367,052, filed on Jun. 27, 2022.

(51) Int. Cl.
*G06T 15/20* (2011.01)
*G06T 17/20* (2006.01)

(52) U.S. Cl.
CPC .............. *G06T 15/20* (2013.01); *G06T 17/20* (2013.01)

(58) Field of Classification Search
CPC .......... G06T 15/20; G06T 17/20; G06T 15/04
See application file for complete search history.

(56) References Cited

U.S. PATENT DOCUMENTS

| | | | |
|---|---|---|---|
| 2020/0288114 A1* | 9/2020 | Lakshman | ........... H04N 13/383 |
| 2020/0293809 A1* | 9/2020 | Itakura | .................... G06V 10/25 |
| 2021/0225073 A1* | 7/2021 | Tytgat | ..................... G06T 17/20 |
| 2022/0156954 A1* | 5/2022 | Xie | ............................ G06T 7/40 |
| 2023/0377180 A1* | 11/2023 | Ambrus | ................. G06T 15/20 |

* cited by examiner

*Primary Examiner* — Michelle Chin
(74) *Attorney, Agent, or Firm* — Fasken Martineau Dumoulin LLP; Johann Gest

(57) ABSTRACT

There is described a method for rendering an image of a 3D environment. The method comprises: receiving a plurality of reference images, each reference image representing a respective view of the 3D environment according to a respective reference viewpoint position; generating a pre-image of the 3D environment according to a given position, direction and field of view, each given pixel of the pre-image encompassing a respective portion of the 3D environment; and for each given pixel: identifying, amongst the reference viewpoint positions, an adequate viewpoint position for the given pixel; identifying a given one of the reference images; and assigning a given texture value to the given pixel based on the respective reference texture value associated with the given one of the reference pixels, thereby texturing the pre-image and obtaining a rendered image; and outputting the rendered image.

34 Claims, 3 Drawing Sheets

300

302
Accessing a database comprising a plurality of reference 2D images, each reference 2D image representing a respective view of the 3D environment according to a respective reference viewpoint position within the 3D environment, each reference 2D image comprising a respective plurality of reference pixels each having a respective reference texture value associated thereto 304
Generating a given image of the mesh according to a given position within the 3D environment and a given field of view, the given image comprising a plurality of given pixels and each given pixel encompassing a respective portion of the 3D mesh 306
For each given pixel:
    identifying, amongst the reference viewpoint positions, an adequate viewpoint position for the given pixel;
    identifying a given one of the reference 2D images of which the respective reference viewpoint position matches the adequate viewpoint position and for which a given one of the reference pixels encompasses the respective portion of the 3D mesh; and
    assigning a given texture value to the given pixel based on the respective reference texture value associated with the given one of the reference pixels, thereby texturing the given image 308
Outputting the rendered image

200

300

302

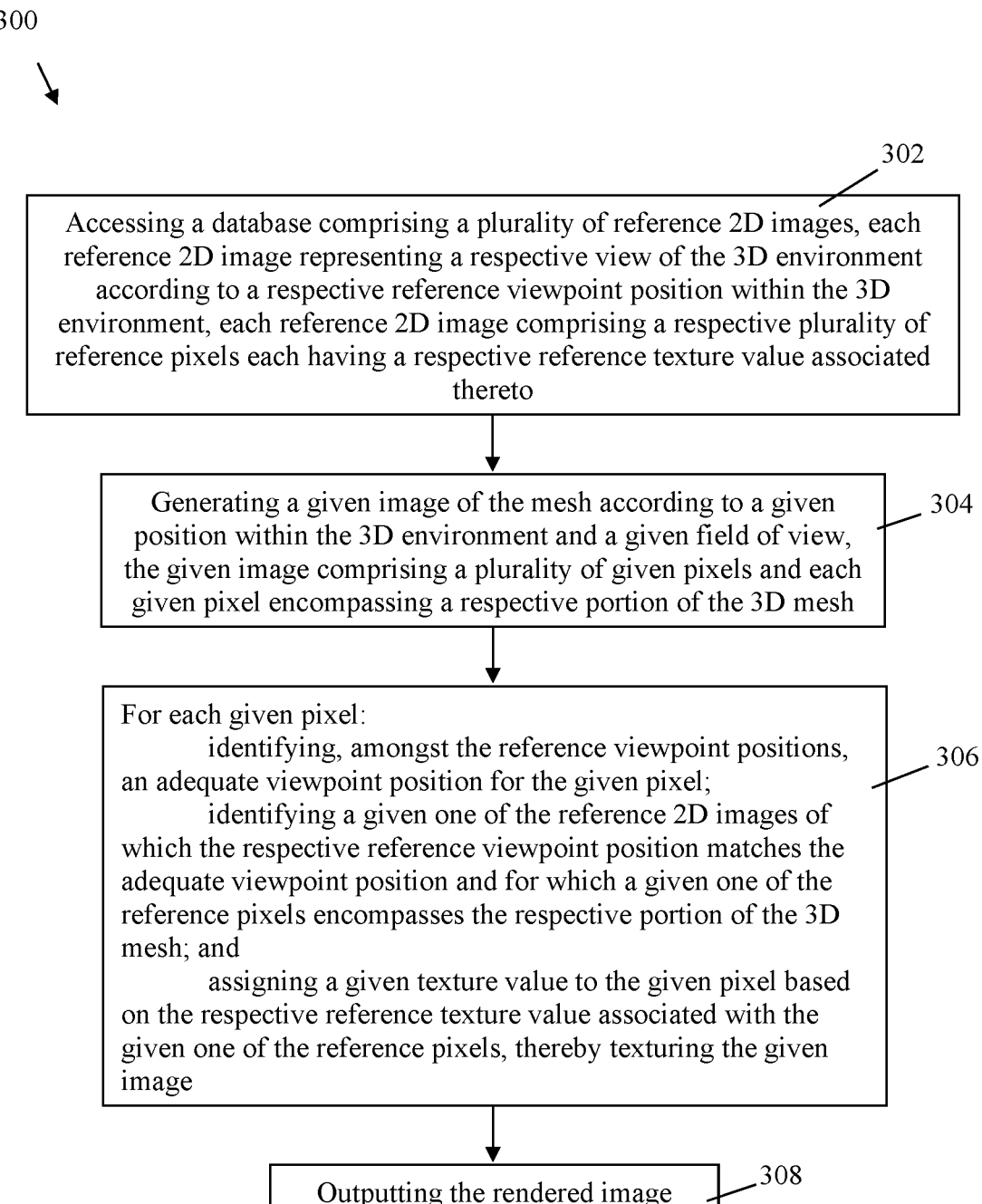

Accessing a database comprising a plurality of reference 2D images, each reference 2D image representing a respective view of the 3D environment according to a respective reference viewpoint position within the 3D environment, each reference 2D image comprising a respective plurality of reference pixels each having a respective reference texture value associated thereto

304

Generating a given image of the mesh according to a given position within the 3D environment and a given field of view, the given image comprising a plurality of given pixels and each given pixel encompassing a respective portion of the 3D mesh

306

For each given pixel:
      identifying, amongst the reference viewpoint positions, an adequate viewpoint position for the given pixel;
      identifying a given one of the reference 2D images of which the respective reference viewpoint position matches the adequate viewpoint position and for which a given one of the reference pixels encompasses the respective portion of the 3D mesh; and
      assigning a given texture value to the given pixel based on the respective reference texture value associated with the given one of the reference pixels, thereby texturing the given image

308

Outputting the rendered image

FIGURE 3

METHOD AND SYSTEM FOR TEXTURING AN IMAGE

CROSS-REFERENCE TO RELATED APPLICATION

The present application claims priority on U.S. Provisional Patent Application No. 63/367,052 filed on Jun. 27, 2022.

FIELD present technology pertains to the field of image rendering, and more particularly to image texturing.

BACKGROUND

Prior art methods for texturing an image are usually dependent on information embedded in the 3D environment, and textures can generally not be applied to different models of the same environment such as models of the same environment having different levels of detail. As a result, when the 3D environment is represented by a 3D mesh, textures must usually be duplicated for different levels of details in 3D meshes.

Therefore, there is a need for a method and system for texturing images of a 3D environment independently of the format and level of detail of the model representing the 3D environment.

SUMMARY

According to a first broad aspect, there is provided a method for rendering an image of a 3D environment, the method comprising: receiving a plurality of reference images, each reference image representing a respective view of the 3D environment according to a respective reference viewpoint position within the 3D environment, each reference image comprising a respective plurality of reference pixels having a respective reference texture value associated thereto; generating a pre-image of the 3D environment according to a given position within the 3D environment, a given direction and a given field of view, the pre-image comprising a plurality of given pixels and each given pixel encompassing a respective portion of the 3D environment; and for each given pixel: identifying, amongst the reference viewpoint positions, an adequate viewpoint position for the given pixel; identifying a given one of the reference images of which the respective reference viewpoint position matches the adequate viewpoint position and for which a given one of the reference pixels encompasses the respective portion of the 3D environment; and assigning a given texture value to the given pixel based on the respective reference texture value associated with the given one of the reference pixels, thereby texturing the pre-image and obtaining a rendered image; and outputting the rendered image.

In one embodiment, at least one of the reference images comprises a panorama image.

In one embodiment, the step of receiving the plurality of reference images comprises generating the reference images according to the respective reference viewpoint position, a respective reference direction and a respective reference field of view.

In one embodiment, the method further comprises receiving at least one of the respective reference viewpoint position, the respective reference direction and the respective reference field of view.

In one embodiment, the method further comprises determining at least one of the respective reference viewpoint position, the respective reference direction and the respective reference field of view.

In one embodiment, the step of identifying the adequate viewpoint position comprises retrieving a predefined viewpoint position and selecting the adequate viewpoint position based on the predefined viewpoint position.

In one embodiment, the predefined viewpoint position comprises one of the reference viewpoint positions.

In one embodiment, the method further comprises for each reference image for which the given one of the reference pixels encompasses the respective portion of the 3D mesh: determining at least one of: a distance between the reference viewpoint position and a position of the respective portion of the 3D mesh; a first angle between a first axis that passes by the reference viewpoint position and the position of the respective portion of the 3D mesh and a second axis that passes by the given position and the position of the respective portion of the 3D mesh; and a second angle between a third axis orthogonal to the portion of the 3D mesh and a fourth axis that passes by the position of the respective portion of the 3D mesh and the reference viewpoint position, said identifying the adequate viewpoint position being performed based on at least one of the distance, the first angle and the second angle.

In one embodiment, the step of determining the distance is performed using a depth image corresponding to the reference image.

In one embodiment, the method further comprises generating the depth map.

In one embodiment, the method further comprises receiving a 3D model representative of the 3D virtual environment, said generating the pre-image being performed using the 3D model.

In one embodiment, the 3D model comprises one of a 3D mesh and a point cloud.

In one embodiment, the step of generating the pre-image is performed using an implicit surface modeling method.

In one embodiment, the step of generating the pre-image is performed using a machine learning model trained to generate the pre-image of the 3D environment.

In one embodiment, the machine learning model comprises a deep learning model.

In one embodiment, the deep learning model comprises a Neural Radiance Fields (NeRF) model.

In one embodiment, the reference texture value and the given texture value each comprise a color value.

According to another broad aspect, there is provided a system for rendering an image of a 3D environment, the system comprising: a processor; and a non-transitory computer readable storage medium comprising instructions stored thereon; the processor, upon execution of the instructions, being configured for: receiving a plurality of reference images, each reference image representing a respective view of the 3D environment according to a respective reference viewpoint position within the 3D environment, each reference image comprising a respective plurality of reference pixels having a respective reference texture value associated thereto; generating a pre-image of the 3D environment according to a given position within the 3D environment, a given direction and a given field of view, the pre-image comprising a plurality of given pixels and each given pixel encompassing a respective portion of the 3D environment; for each given pixel: identifying, amongst the reference viewpoint positions, an adequate viewpoint position for the given pixel; identifying a given one of the reference images of which the respective reference viewpoint position matches the adequate viewpoint position and for which a given one of the reference pixels encompasses the respective portion of the 3D environment; and assigning a given texture value to the given pixel based on the respective reference texture value associated with the given one of the reference pixels, thereby texturing the pre-image and obtaining a rendered image; and outputting the rendered image.

In one embodiment, at least one of the reference images comprises a panorama image.

In one embodiment, the processor is configured for generating the reference images according to the respective reference viewpoint position, a respective reference direction and a respective reference field of view.

In one embodiment, the processor is further configured for receiving at least one of the respective reference viewpoint position, the respective reference direction and the respective reference field of view.

In one embodiment, the processor is further configured for determining at least one of the respective reference viewpoint position, the respective reference direction and the respective reference field of view.

In one embodiment, the step of identifying the adequate viewpoint position comprises retrieving a predefined viewpoint position and selecting the adequate viewpoint position based on the predefined viewpoint position.

In one embodiment, the predefined viewpoint position comprises one of the reference viewpoint positions.

In one embodiment, the processor is further configured for, for each reference image for which the given one of the reference pixels encompasses the respective portion of the 3D mesh: determining at least one of: a distance between the reference viewpoint position and a position of the respective portion of the 3D mesh; a first angle between a first axis that passes by the reference viewpoint position and the position of the respective portion of the 3D mesh and a second axis that passes by the given position and the position of the respective portion of the 3D mesh; and a second angle between a third axis orthogonal to the portion of the 3D mesh and a fourth axis that passes by the position of the respective portion of the 3D mesh and the reference viewpoint position, said identifying the adequate viewpoint position being performed based on at least one of the distance, the first angle and the second angle.

In one embodiment the step of determining the distance is performed using a depth image corresponding to the reference image.

In one embodiment, the processor is further configured for generating the depth map.

In one embodiment, the processor is further configured for receiving a 3D model representative of the 3D virtual environment, said generating the pre-image being performed using the 3D model.

In one embodiment the 3D model comprises one of a 3D mesh and a point cloud.

In one embodiment, step of generating the pre-image is performed using an implicit surface modeling method.

In one embodiment, the step of generating the pre-image is performed using a machine learning model trained to generate the pre-image of the 3D environment.

In one embodiment, the machine learning model comprises a deep learning model.

In one embodiment, the deep learning model comprises a Neural Radiance Fields (NeRF) model.

In one embodiment, the reference texture value and the given texture value each comprise a color value.

Definitions

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that can run software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 3 illustrates a method for rendering an image of a 3D virtual environment, in accordance with non-limiting embodiments of the present technology.

DETAILED DESCRIPTION

Figure 1:
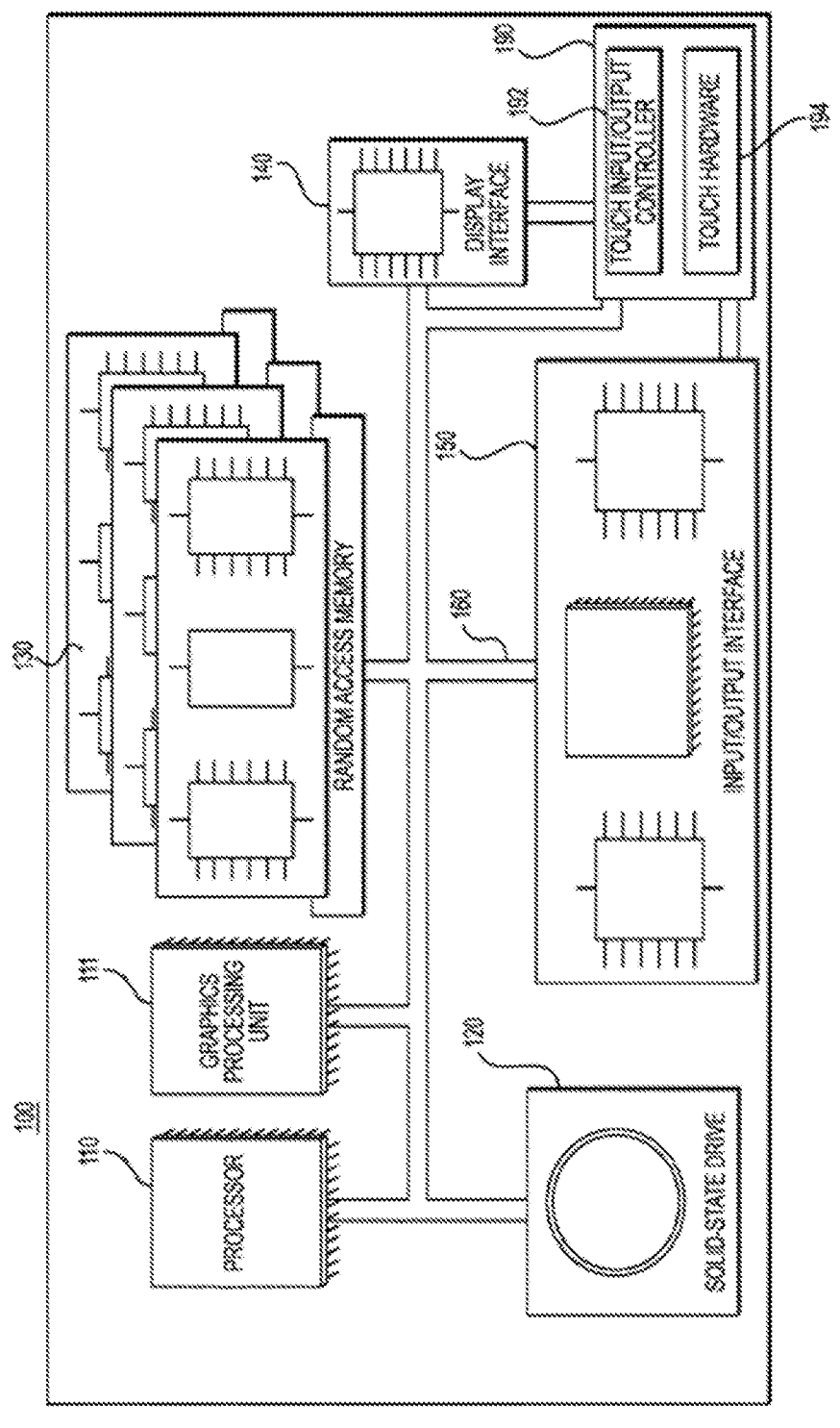
FIG. 1 is a schematic diagram of an electronic device, in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "pro-cessor" or a "graphics processing unit", may be provided through the use of dedicated hardware as well as hardware capable of executing software in association with appropri-ate software. When provided by a processor, the functions may be provided by a single dedicated processor, by a single shared processor, or by a plurality of individual processors, some of which may be shared. In some non-limiting embodi-ments of the present technology, the processor may be a general-purpose processor, such as a central processing unit (CPU) or a processor dedicated to a specific purpose, such as a graphics processing unit (GPU). Moreover, explicit use of the term "processor" or "controller" should not be con-strued to refer exclusively to hardware capable of executing software, and may implicitly include, without limitation, digital signal processor (DSP) hardware, network processor, application specific integrated circuit (ASIC), field program-mable gate array (FPGA), read-only memory (ROM) for storing software, random access memory (RAM), and non-volatile storage. Other hardware, conventional and/or cus-tom, may also be included.

Software modules, or simply modules which are implied to be software, may be represented herein as any combina-tion of flowchart elements or other elements indicating performance of process steps and/or textual description. Such modules may be executed by hardware that is expressly or implicitly shown.

With these fundamentals in place, we will now consider some non-limiting examples to illustrate various implemen-tations of aspects of the present technology.

Referring to FIG. 1, there is shown an electronic device 100 suitable for use with some implementations of the present technology, the electronic device 100 comprising various hardware components including one or more single or multi-core processors collectively represented by proces-sor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pres-sure-sensitive cells embedded in a layer of a display allow-ing detection of a physical interaction between a user and the display) and a touch input/output controller 192 allowing communication with the display interface 140 and/or the one or more internal and/or external buses 160. In some embodi-ments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

Figure 2:
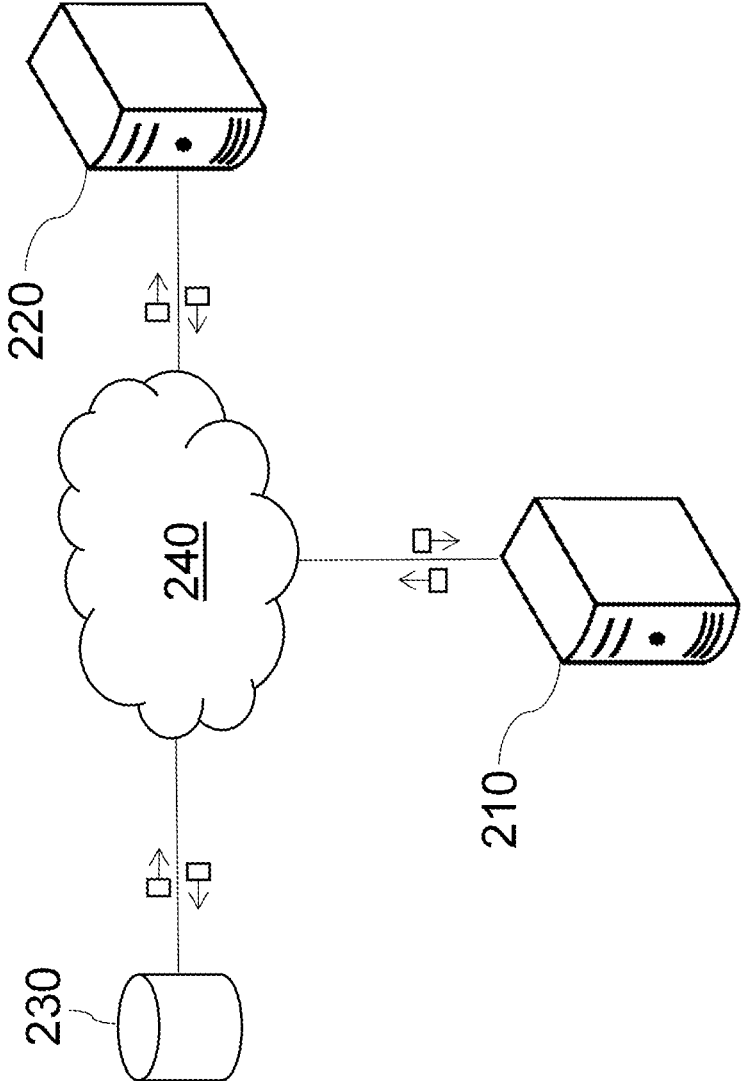
FIG. 2 depicts a schematic diagram of a system, in accordance with non-limiting embodiments of the present technology.

Referring to FIG. 2, there is shown a schematic diagram of a system 200, the system 200 being suitable for imple-menting non-limiting embodiments of the present technol-ogy. It is to be expressly understood that the system 200 as shown is merely an illustrative implementation of the pres-ent technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be inter-preted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various imple-mentations of the present technology may be of a greater complexity.

The system 200 comprises inter alia a first server 210, a user electronic device 220 such as a computer, a laptop, a smartphone, a tablet, or the like and a database 230 com-municatively coupled over a communications network 240.

Generally speaking, the first server 210 is configured for rendering an image of a 3D virtual environment by:

receiving a plurality of reference images, each reference image representing a respective view of the 3D envi-ronment according to a respective reference viewpoint position within the 3D environment, each reference image comprising a respective plurality of reference pixels having a respective reference texture value asso-ciated thereto;

generating a pre-image of the 3D environment according to a given position within the 3D environment, a given direction and a given field of view, the pre-image comprising a plurality of given pixels and each given pixel encompassing a respective portion of the 3D environment; and for each given pixel:

identifying, amongst the reference viewpoint positions, an adequate viewpoint position for the given pixel;

identifying a given one of the reference images of which the respective reference viewpoint position matches the adequate viewpoint position and for which a given one of the reference pixels encompasses the respective portion of the 3D environment; and assigning a given texture value to the given pixel based on the respective reference texture value associated with the given one of the reference pixels, thereby texturing the pre-image and obtaining a rendered image; and outputting the rendered image.

The first server 210 can be implemented as a conventional computer server and may comprise at least some of the features of the electronic device 100 shown in FIG. 1. In a non-limiting example of an embodiment of the present technology, the first server 210 can be implemented as server running an operating system. Needless to say, the first server 210 can be implemented in any other suitable hardware and/or software and/or firmware or a combination thereof. In the shown non-limiting embodiment of present technology, the first server 210 is a single server. In alternative non-limiting embodiments of the present technology, the functionality of the first server 210 may be distributed and may be implemented via multiple servers (not shown).

The implementation of the first server 210 is well known to the person skilled in the art of the present technology. However, briefly speaking, the first server 210 comprises a communication interface (not shown) structured and configured to communicate with various entities (such as the knowledge source 230, for example and other devices potentially coupled to the network) via the network 240. The first server 210 further comprises at least one computer processor (e.g., the processor 110 of the electronic device 100) operationally connected with the communication interface and structured and configured to execute various processes to be described herein.

Referring back to FIG. 2, at least one database 230 having stored therein data representative of the 3D virtual environment such as a 3D mesh, a cloud point or the like, and the 2D reference images and their respective characteristics such as their respective reference viewpoint position via the communications network 240. Although the database 230 is illustrated schematically herein as a single entity, it is contemplated that the database 230 may be configured in a distributed manner, for example, the database 230 could have different components, each component being configured for a particular kind of retrieval therefrom or storage therein.

In one embodiment, the database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the first server 220. Generally speaking, the database 230 may receive data from the first server 220 for storage thereof and may provide stored data to the first server 220 for use thereof.

Referring back to FIG. 2, the system 200 also comprises an electronic device 220 such as a user computer, a laptop, a smartphone, a tablet or the like. A user uses the electronic device 220 to access the server 210 and obtain 2D images of a 3D environment.

In some non-limiting embodiments of the present technology, the first server 210 may be implemented as a single server. In other non-limiting embodiments, functionality of the first server 210 may distributed among a plurality of electronics devices.

In some embodiments of the present technology, the communication network 240 is the Internet. In alternative non-limiting embodiments, the communication network 240 can be implemented as any suitable local area network (LAN), wide area network (WAN), a private communication network or the like. It should be expressly understood that implementations for the communication network 240 are for illustration purposes only. How a communication link (not separately numbered) between the first server 210, the database 230, the electronic device 220 and/or another electronic device (not shown) and the communications network 240 is implemented will depend inter alia on how each electronic device is implemented.

FIG. 3 illustrates one embodiment of a method 300 for rendering an image of a 3D virtual environment that may be executed by the server 210.

Before the execution of the method 300, the user connects to the server 210 using his electronic device 220 and selects a given 3D virtual environment to be displayed. The server 210 then generates a first or initial image corresponding to an initial view of the 3D virtual environment and transmits the initial image to the electronic device 220 for display thereon.

The user may then interact with the 3D virtual environment to display a new view of the 3D virtual environment. For example, the user may zoom in or out, move within the 3D virtual environment, rotate or turn, etc. Each time a user requires a new view of the 3D virtual environment to be displayed, the following steps are performed by the server 210 to generate and render an image.

At step 302, the server 210 accesses a plurality of reference images of the 3D virtual environment stored in the database 230. Each reference image corresponds to a respective view of the 3D virtual environment. Each view is defined by a respective viewpoint position from which the image is generated, a respective field of view and a respective direction along which the field of view is centered. Each reference image corresponds to a rendered image of the 3D virtual environment, i.e., a reference image comprises a plurality of pixels and each pixel has a texture value associated thereto. For example, the texture value may comprise a color value, a roughness value, and/or the like.

In one embodiment, a reference image is a panorama image of the 3D virtual environment, e.g., a 360 degrees image of the 3D environment taken from its respective viewpoint position, and its respective direction may indicate the beginning of the panorama.

In one embodiment, the 3D virtual environment corresponds to a 3D model of a real environment and the reference images correspond to pictures or images of the real environment. For example, the reference images may correspond to the images of the real 3D environment used for creating the 3D virtual environment.

It should be understood that the 3D position within the 3D environment of an element of the 3D environment represented in a pixel of a reference image is also associated with the pixel.

The server 210 receives a command indicative that a new image of the 3D environment must be generated and provided to the electronic device 220 for display thereon. In an embodiment in which the field of view for generating the new image is fixed and predefined, the command is indicative of a given viewpoint position within the 3D environment and a given direction from which the new image is to be generated. In another embodiment, the command is indicative of the a given viewpoint position within the 3D environment, a given field of view and a given direction from which the new image is to be generated.

At step 304, a pre-image is generated by the server 210 according to the received viewpoint position within the 3D virtual environment, the given direction and the given direction. A pre-image of the 3D virtual environment corresponds to an image of the 3D virtual environment for which the texture information is lacking, i.e. the pixels of a pre-image have no texture value associated thereto.

It should be understood that any adequate method for generating the pre-image of the 3D virtual environment can be used.

In one embodiment, the pre-image is generated based on a 3D model representing the 3D virtual environment. The 3D model comprises data from which an image of the 3D virtual environment can be generated. The 3D model can be stored in the database 230. In one embodiment, the 3D model comprises a 3D mesh associated with the 3D virtual environment. In this case, the method 300 further comprises receiving or accessing the 3D mesh and the pre-image is generated using the 3D model. In another embodiment, the 3D model comprises a point cloud representing the 3D virtual environment. In this case, the method further comprises receiving or accessing the point cloud and the pre-image is generated using the point cloud.

In another embodiment, the pre-image is generated using an implicit surface modeling method.

In still another embodiment, the pre-image is generated using a machine learning model trained to generate pre-images of the 3D virtual environment such as a deep learning model. For example, the deep learning model may be a Neural Radiance Fields (NeRF) model trained to generate pre-images of a 3D virtual environment from various viewpoint positions within the 3D virtual environment.

At step 306, a texture value is assigned to each pixel of the pre-image by the server 210. For each pixel of the pre-image the following steps are performed by the server 210.

First, an adequate viewpoint position is selected amongst the reference viewpoint positions associated with the reference images, for each pixel of the pre-image. It should be understood that several different methods may be used for selecting the adequate viewpoint position for the pixels of the pre-image.

In one embodiment, the adequate viewpoint position corresponds to the reference viewpoint position, i.e., the viewpoint position of a reference image, that best matches the viewpoint position associated with the pre-image. In this case, the adequate viewpoint position corresponds to the reference viewpoint position from which the visible environment corresponds the most to the visible environment obtained from the viewpoint position associated with the pre-image. In one embodiment, the adequate viewpoint position corresponds to the reference viewpoint position that is the closest from the viewpoint position associated with the pre-image.

In another embodiment, the adequate viewpoint position for the pixel is chosen amongst the reference viewpoint positions of the reference images based on the distance between the position of the portion of the 3D virtual environment encompassed by the pixel and a reference viewpoint position. In one embodiment, the distance between the position of the 3D virtual environment portion and the reference viewpoint position is determined for each reference viewpoint position, and the adequate viewpoint position corresponds to the reference viewpoint position that is the closest from the portion of the 3D mesh encompassed by the pixel, i.e., the reference viewpoint position for which the calculated distance is the shortest one.

In one embodiment, the database 230 comprises a depth map for each reference image. In this case, the distance between a reference viewpoint and the position of the portion of the 3D mesh encompassed by the pixel is retrieved from depth map.

In a further embodiment, the adequate viewpoint position for the pixel is chosen amongst the reference viewpoint positions of the reference images based on the angle between two axes, i.e., between a first axis passing by the position of the portion of the 3D mesh that is encompassed by the pixel and a reference viewpoint position, and a second axis that passes by the position of the portion of the 3D mesh that is encompassed by the pixel and the given viewpoint position from which the new image is to be generated. In one embodiment, the angle is determined for each reference viewpoint position of the reference images and the adequate viewpoint position for the pixel is chosen as being the reference viewpoint position for which the calculated angle is the smallest.

In still a further embodiment, the adequate viewpoint position for the pixel is chosen amongst the reference viewpoint positions of the reference images based on a combination of the above-described distance and angle. For example, the distance and angle may be calculated for each reference viewpoint position and a score may be assigned to each reference viewpoint based on the calculated distance and angle. For example, the score may correspond to a weighted summation of the distance and angle.

In still another embodiment, the adequate viewpoint position for the pixel is chosen amongst the reference viewpoint positions of the reference images based on the axis that is orthogonal to the portion of the 3D mesh encompassed by the pixel and passes by the center of the portion of the 3D mesh. For example, the adequate viewpoint position may be the reference viewpoint position that is the closest to the orthogonal axis. It should be that the closeness to the orthogonal axis may be combined with another parameter such as the above-described distance using a weighted summation in order to select the adequate viewpoint position.

In one embodiment, the database 230 comprises a predefined viewpoint position associated with each portion of the 3D mesh. In this case, the predefined viewpoint position associated with the portion of the 3D mesh encompassed by the pixel is retrieved from the database 230 and the adequate predefined viewpoint for the pixel is determined based on the retrieved predefined viewpoint position.

In one embodiment, each predefined viewpoint position stored in the database 230 and associated with a respective portion of the 3D mesh corresponds to a reference viewpoint position. In this case, the step of selecting the adequate viewpoint position amongst the reference viewpoint positions for a given pixel consists in retrieving the predefined viewpoint position associated with the 3D portion of the mesh encompassed by the given pixel.

In another embodiment in which the predefined viewpoint positions stored in the memory do not correspond to the reference viewpoint positions, the adequate viewpoint position is determined based on the predefined viewpoint position associated with the 3D portion of the mesh encompassed by the pixel. For example, the adequate viewpoint position for a pixel may the reference viewpoint position that is the closest from the predefined viewpoint position associated with the 3D portion of the mesh that is encompassed by the pixel.

Once the adequate viewpoint position for a pixel has been determined, the next step consists in analysing the references images to identify at least one reference image of which the associated reference viewpoint position matches the adequate viewpoint position determined for the pixel of the pre-image and for which a given pixel encompasses the same portion of the 3D mesh as that encompassed by the pixel of the pre-image. As a result, at least one reference image is identified and a given pixel of the identified reference image is also identified, i.e., the given pixel of the identified reference image that encompasses the same portion of the 3D mesh as that encompassed by the pixel of the pre-image. It should be understood that more than one reference image may be identified. In this case, the reference viewpoint position of each identified reference image matches the adequate viewpoint position determined for the pixel of the pre-image and each identified reference image comprises a pixel that encompasses the same portion of the 3D mesh as that encompassed by the pixel of the pre-image.

Finally, a texture value is assigned to the pixel of the pre-image based on the texture value assigned to the pixel identified in the identified reference image.

In one embodiment, the texture value of the identified pixel of the identified reference image is assigned to the pixel of the pre-image.

In an embodiment in which more than one reference image has been identified, the texture value to be assigned to the pixel of the pre-image can be determined based on the texture value assigned to the identified pixel of each identified reference image. For example, if two references images have been identified as having the same viewpoint position as the adequate viewpoint position and comprising a given pixel that encompasses the same portion of the 3D mesh as that encompassed by the pixel of the pre-image, the texture value assigned to the pixel of the pre-image can be the average of the texture values of the identified pixels in the two identified reference images.

The above-described steps are repeated for each pixel of the pre-image so that a texture value is assigned to each pixel of the pre-image, thereby obtaining a rendered image.

In an embodiment in which no reference image can be identified for a given pixel of the pre-image, a predefined texture value can be assigned to the given pixel. In another example, the texture value for the given pixel can be determined based on the texture value of the pixels surrounding the given pixel.

The rendered image is then outputted for display at step 308. For example, the server 210 transmits the rendered image to the electronic device 220 for display thereon. In the same or another example, the rendered image may be stored in memory.

In one embodiment, the method 300 further comprises a step of generating the references images from the 3D virtual environment each based on a respective viewpoint position within the 3D virtual environment, a respective field of view and a respective direction. In one embodiment, the viewpoint positions, the fields of view and the directions are automatically generated. For example, the viewpoint positions and the directions may be randomly selected while the field of view may be fixed and predefined. In another embodiment, the viewpoint positions, the fields of view and the directions are received from a user. In still another embodiment, at least one of the viewpoint positions, the fields of view and the directions is received from a user while the other(s) is (are) automatically generated. For example, the viewpoints and the directions for generating the reference images may be received from a user while the fields of view may be automatically generated. In this case, a same predefined field of view may be used for generating the reference images.

It should be understood that any adequate method for rendering the reference images using the viewpoint positions, the fields of view and the directions from the 3D virtual environment can be used. A texture value is first added to the 3D mesh to obtain a colored 3D mesh and then a reference image is generated from the colored 3D mesh based on the viewpoint position, the direction and the field of view associated with the reference image. For example, in order to add color to the 3D mesh, a color may be defined for each vertex of each triangle of the 3D mesh. Then the colors of the three vertices are interpolated for points within the triangles, thereby obtaining a colored 3D mesh. In another example, a colored 3D mesh is obtained by storing the colors in a 2D image and then mapping the triangles of the mesh to parts of the images using 2D coordinates (called UV). Each vertex of the colored 3D mesh is then provided with a 3D coordinate for its position, and a 2D coordinate for its UV.

In one embodiment, the method 300 further comprises the step of generating the depth maps.

In at least some embodiments, the present method and system allows texturing images of a 3D environment independently of the format of the model representing the 3D environment (same texture data for a mesh, a point cloud, a neural network, etc.) and independently of the level of detail of the model.

In at least some embodiments, the present method and system allows for the texturing of typically untextured 3D model formats, such as point clouds, where the color information is usually encoded per point, thereby constraining the color detail to the geometric detail.

Modifications and improvements to the above-described implementations of the present technology may become apparent to those skilled in the art. The foregoing description is intended to be exemplary rather than limiting.

What is claimed is:

1. A method for rendering an image of a 3D environment, the method comprising:

receiving a plurality of reference images, each reference image representing a respective view of the 3D environment according to a respective reference viewpoint position within the 3D environment, each reference image comprising a respective plurality of reference pixels having a respective reference texture value associated thereto;

generating, using a 3D model re of the 3D environment, a pre-image of the 3D environment according to a given position within the 3D environment, a given direction and a given field of view, the pre-image comprising a plurality of given pixels having no texture value assigned thereto and each given pixel encompassing a respective portion of the 3D model;

for each given pixel:

identifying, amongst the reference viewpoint positions, an adequate viewpoint position for the given pixel;

identifying a given one of the reference images of which the respective reference viewpoint position matches the adequate viewpoint position and for which a given one of the reference pixels encompasses the respective portion of the 3D environment; and assigning a given texture value to the given pixel based on the respective reference texture value associated with the given one of the reference pixels, thereby texturing the pre-image and obtaining a rendered image; and outputting the rendered image.

2. The method of claim 1, wherein at least one of the reference images comprises a panorama image.

3. The method of claim 1, wherein said receiving the plurality of reference images comprises generating the reference images according to the respective reference viewpoint position, a respective reference direction and a respective reference field of view.

4. The method of claim 3, further comprising receiving at least one of the respective reference viewpoint position, the respective reference direction and the respective reference field of view.

5. The method of claim 3, further comprising determining at least one of the respective reference viewpoint position, the respective reference direction and the respective reference field of view.

6. The method of claim 1, wherein said identifying the adequate viewpoint position comprises retrieving a predefined viewpoint position and selecting the adequate viewpoint position based on the predefined viewpoint position.

7. The method of claim 6, wherein the predefined viewpoint position comprises one of the reference viewpoint positions.

8. The method of claim 1, further comprising for each reference image for which the given one of the reference pixels encompasses the respective portion of the 3D model:

determining at least one of:

a distance between the reference viewpoint position and a position of the respective portion of the 3D model;

a first angle between a first axis that passes by the reference viewpoint position and the position of the respective portion of the 3D model and a second axis that passes by the given position and the position of the respective portion of the 3D model; and a second angle between a third axis orthogonal to the portion of the 3D model and a fourth axis that passes by the position of the respective portion of the 3D model and the reference viewpoint position, said identifying the adequate viewpoint position being performed based on at least one of the distance, the first angle and the second angle.

9. The method of claim 8, wherein said determining the distance is performed using a depth image corresponding to the reference image.

10. The method of claim 9, further comprising generating the depth map.

11. The method of claim 1, further comprising receiving the 3D model representative of the 3D environment.

12. The method of claim 11, wherein the 3D model comprises one of a 3D mesh and a point cloud.

13. The method of claim 1, wherein said generating the pre-image is performed using an implicit surface modeling method.

14. The method of claim 1, wherein said generating the pre-image is performed using a machine learning model trained to generate the pre-image of the 3D environment.

15. The method of claim 14, wherein the machine learning model comprises a deep learning model.

16. The method of claim 15, wherein the deep learning model comprises a Neural Radiance Fields (NeRF) model.

17. The method of claim 1, wherein the reference texture value and the given texture value each comprise a color value.

18. A system for rendering an image of a 3D environment, the system comprising:

a processor; and a non-transitory computer readable storage medium comprising instructions stored thereon;

the processor, upon execution of the instructions, being configured for:

receiving a plurality of reference images, each reference image representing a respective view of the 3D environment according to a respective reference viewpoint position within the 3D environment, each reference image comprising a respective plurality of reference pixels having a respective reference texture value associated thereto;

generating, using a 3D model representative of the 3D environment, a pre-image of the 3D environment according to a given position within the 3D environment, a given direction and a given field of view, the pre-image comprising a plurality of given pixels having no texture value assigned thereto and each given pixel encompassing a respective portion of the 3D model;

for each given pixel:

identifying, amongst the reference viewpoint positions, an adequate viewpoint position for the given pixel;

identifying a given one of the reference images of which the respective reference viewpoint position matches the adequate viewpoint position and for which a given one of the reference pixels encompasses the respective portion of the 3D model; and assigning a given texture value to the given pixel based on the respective reference texture value associated with the given one of the reference pixels, thereby texturing the pre-image and obtaining a rendered image; and outputting the rendered image.

19. The system of claim 18, wherein at least one of the reference images comprises a panorama image.

20. The system of claim 18, wherein said receiving the plurality of reference images comprises generating the reference images according to the respective reference viewpoint position, a respective reference direction and a respective reference field of view.

21. The system of claim 20, further comprising receiving at least one of the respective reference viewpoint position, the respective reference direction and the respective reference field of view.

22. The system of claim 20, further comprising determining at least one of the respective reference viewpoint position, the respective reference direction and the respective reference field of view.

23. The system of claim 18, wherein said identifying the adequate viewpoint position comprises retrieving a predefined viewpoint position and selecting the adequate viewpoint position based on the predefined viewpoint position.

24. The system of claim 23, wherein the predefined viewpoint position comprises one of the reference viewpoint positions.

25. The system of claim 18, further comprising for each reference image for which the given one of the reference pixels encompasses the respective portion of the 3D model:

determining at least one of:

a distance between the reference viewpoint position and a position of the respective portion of the 3D model;

a first angle between a first axis that passes by the reference viewpoint position and the position of the respective portion of the 3D model and a second axis that passes by the given position and the position of the respective portion of the 3D model; and a second angle between a third axis orthogonal to the portion of the 3D model and a fourth axis that passes by the position of the respective portion of the 3D model and the reference viewpoint position, said identifying the adequate viewpoint position being performed based on at least one of the distance, the first angle and the second angle.

26. The system of claim 25, wherein said determining the distance is performed using a depth image corresponding to the reference image.

27. The system of claim 26, further comprising generating the depth map.

28. The method of claim 18, further comprising receiving a 3D model representative of the 3D virtual environment.

29. The method of claim 28, wherein the 3D model comprises one of a 3D mesh and a point cloud.

30. The system of claim 18, wherein said generating the pre-image is performed using an implicit surface modeling method.

31. The system of claim 18, wherein said generating the pre-image is performed using a machine learning model trained to generate the pre-image of the 3D environment.

32. The system of claim 31, wherein the machine learning model comprises a deep learning model.

33. The system of claim 32, wherein the deep learning model comprises a Neural Radiance Fields (NeRF) model.

34. The system of claim 18, wherein the reference texture value and the given texture value each comprise a color value.

\* \* \* \* \*